（12) United States Patent
Eivy et al.

(10) Patent No.: US 12,192,583 B2
(45) Date of Patent: *Jan. 7, 2025

(54) CURATING NARRATIVE EXPERIENCES THROUGH AUTOMATED CONTENT COMPILATION

(71) Applicant: Disney Enterprises, Inc., Burbank, CA (US)

(72) Inventors: Adam D. Eivy, Vashon, WA (US); Katharine S. Navarre, Santa Monica, CA (US); Ricky Kane Stapler, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,738

(22) Filed: Oct. 18, 2022

(65) Prior Publication Data

US 2023/0041978 A1    Feb. 9, 2023

Related U.S. Application Data

(63) Continuation of application No. 17/120,923, filed on Dec. 14, 2020, now Pat. No. 11,509,962.

(51) Int. Cl.
*H04N 21/466* (2011.01)
*H04N 21/45* (2011.01)

(52) U.S. Cl.
CPC ....... *H04N 21/466* (2013.01); *H04N 21/4532* (2013.01)

(58) Field of Classification Search
CPC .......... H04N 21/25891; H04N 21/812; H04N 21/26258; H04N 21/4825; H04N 21/4532; H04N 21/84
See application file for complete search history.

(56) References Cited

U.S. PATENT DOCUMENTS

| | | | | |
|---|---|---|---|---|
| 6,144,375 A * | 11/2000 | Jain | ...................... | G11B 27/105 |
| | | | | 715/251 |
| 9,883,252 B2 * | 1/2018 | Hall | ...................... | H04N 21/252 |
| 10,083,232 B1 * | 9/2018 | Durham | ............. | H04N 21/4826 |
| 10,222,939 B1 * | 3/2019 | Lewis | ................. | H04L 12/1822 |
| 11,197,068 B1 * | 12/2021 | Patricks | ............. | H04N 21/4825 |

(Continued)

*Primary Examiner* — Jason Salce
(74) *Attorney, Agent, or Firm* — Farjami & Farjami LLP

(57) ABSTRACT

A content compilation system includes a computing platform having a hardware processor and a memory storing a software code configured to provide an editorial interface. The hardware processor executes the software code to receive compilation authoring data via the editorial interface, identify one or more end-user(s) for receiving a content compilation, access a consumption profile of the end-user(s), obtain, using the consumption profile and a first authoring criterion in the compilation authoring data, content items from one or more content sources. The software code further aggregates, using a second authoring criterion in the compilation authoring data, the content items into content subsets, groups, using a third authoring criterion, at least some of the content subsets to produce the content compilation, computes a desirability score predicting the desirability of the content compilation to the end-user(s), and provides, when the desirability score satisfies a predetermined threshold, the content compilation to the end-user(s).

14 Claims, 6 Drawing Sheets

(56) References Cited

U.S. PATENT DOCUMENTS

| | | | | |
|---|---|---|---|---|
| 2004/0073924 | A1* | 4/2004 | Pendakur | H04N 21/4622 348/E7.071 |
| 2005/0251807 | A1* | 11/2005 | Weel | H04L 67/306 719/310 |
| 2010/0251304 | A1* | 9/2010 | Donoghue | H04N 21/47202 725/46 |
| 2011/0041157 | A1* | 2/2011 | Dasher | H04N 21/4826 725/98 |
| 2012/0060195 | A1* | 3/2012 | Fishman | H04N 21/4826 725/116 |
| 2012/0278342 | A1* | 11/2012 | Purdy | G06F 16/78 707/748 |
| 2013/0318013 | A1* | 11/2013 | Tateno | H04N 21/4756 706/46 |
| 2014/0122590 | A1* | 5/2014 | Svendsen | G06Q 30/0631 709/204 |
| 2016/0071549 | A1* | 3/2016 | von Sneidern | H04N 21/8549 386/241 |
| 2016/0196270 | A1* | 7/2016 | DiMaria | H04L 65/612 707/749 |
| 2016/0360266 | A1* | 12/2016 | Wilms | H04N 21/4756 |
| 2020/0099974 | A1* | 3/2020 | Choi | H04N 21/26225 |
| 2021/0084350 | A1* | 3/2021 | Chandra | H04N 21/8541 |

* cited by examiner

CURATING NARRATIVE EXPERIENCES THROUGH AUTOMATED CONTENT COMPILATION

The present application is a Continuation of U.S. patent application Ser. No. 17/120,923, filed Dec. 14, 2020.

BACKGROUND

Digital media content depicting sports, news, movies, television (TV) programming, print media, and music, for example, is consistently sought out and enjoyed by consumers. Due to its popularity with consumers, ever more digital media content is being produced and made available for distribution, so much so in fact that the availability of new, topical, content far exceeds the capacity for even the most ardent consumers to discover and evaluate.

One conventional approach to making new content easier for a consumer to become aware of is the use of synopses, either brief text descriptions or visual cues, such as thumbnails, for consumers to review. While useful, these synopses typically describe items of content in isolation, and fail to provide any guidance with respect to other items of related or complementary content. Moreover, as a result of the continual proliferation of new content, the individual content items that might be combined to present related subject matter in a more entertaining or informative light are too numerous and too varied to be aggregated and reviewed by a human consumer, or even a trained human editor. Due to the resources often devoted to developing new content, the efficiency and effectiveness with which collections of content likely to be desirable to consumers can be introduced to those consumers has become increasingly important to the producers, owners, and distributors of digital media content.

DETAILED DESCRIPTION

Figure 1:
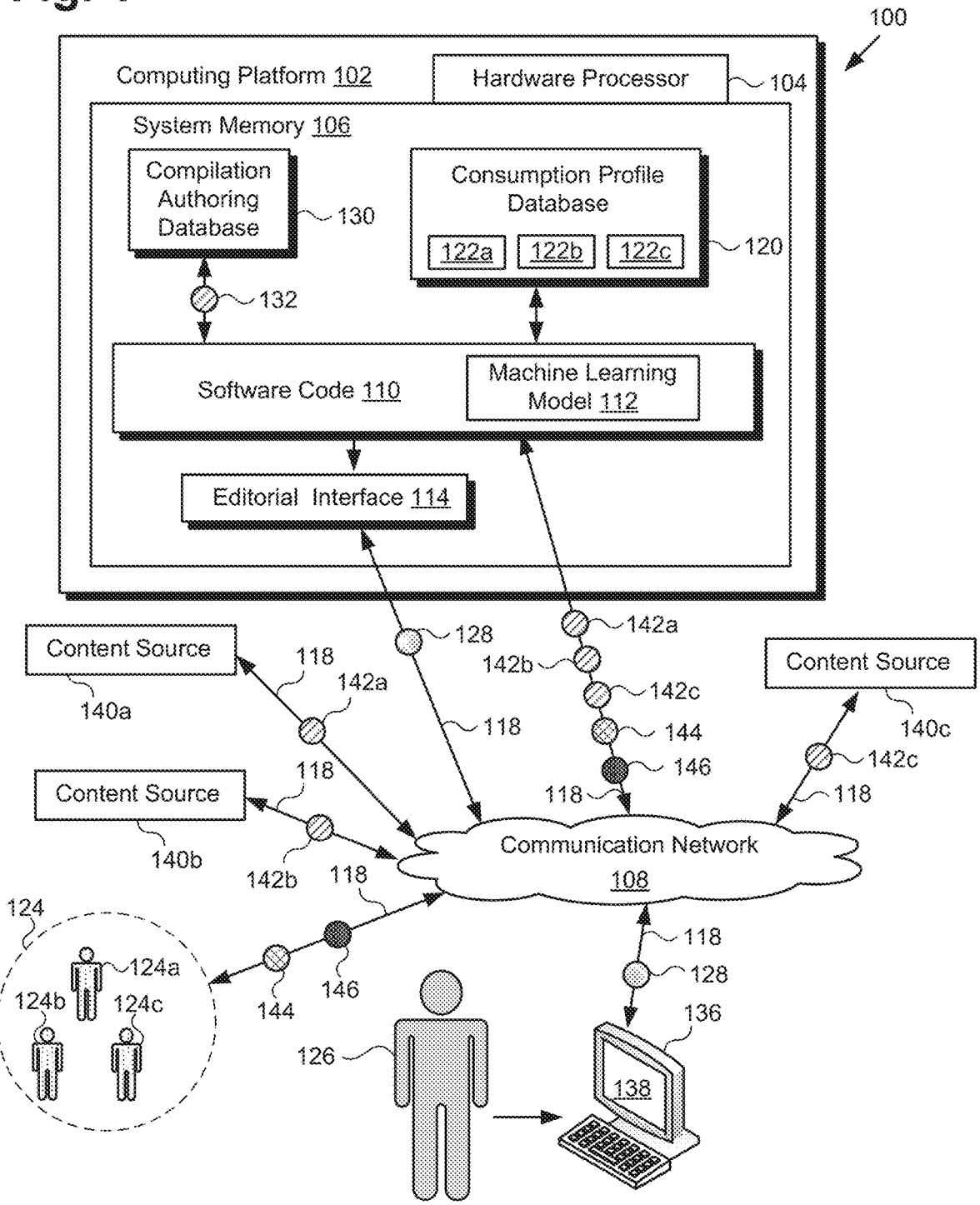
FIG. 1 shows an exemplary content compilation system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for curating narrative experiences through automated content compilations that address and overcome the deficiencies in the conventional art. An automated content compilation system according to the present novel and inventive concepts produces a content compilation for one or more end-users (hereinafter "end-user(s)"), and computes a desirability score predicting the desirability of the content compilation to the end-user(s). The automated content compilation is performed by the system based on a consumption profile of the end-user(s) and either content authoring data received through an editorial interface from a human editor other than the end-user(s), or based on a compilation authoring template generated by a trained machine learning model of the system. When the desirability score for the content compilation produced by the present system satisfies a predetermined threshold, the content compilation may be pushed or otherwise provided to the end-user(s) sua sponte, i.e., proactively by the system, rather than in response to a request for the content compilation from the end user. Moreover, the disclosed system can further receive feedback data rating an actual desirability of the content compilation to the end-user(s), and modify, using the trained machine learning model and the feedback data, a compilation authoring template used by the system to advantageously improve the automated performance by the content compilation system in the future.

It is noted that, as used in the present application, the terms "automation," "automated," and "automating" refer to systems and processes that do not require the participation of a human editor or curator. Although, in some implementations, a human editor or curator may review a content compilation produced by the automated systems and according to the automated methods described herein, that human involvement is optional. Thus, the methods described in the present application may be performed under the control of hardware processing components of the disclosed automated systems.

It is further noted that although the present application is titled "Curating Narrative Experiences through Automated Content Compilation," that characterization is provided as an aid to conceptual clarity and is not to be construed as limiting. The present concepts can be applied to digital media content in a variety of forms, including audio-video content, video content without audio, audio content without video, such as music for instance, still images, graphics, such as sports or weather statistics, and text, to name some examples. Consequently, the term "narrative," as defined for the purposes of the present application, refers to digital media content drawn from one or more of the types of content described above, and is not limited to speech or text. Moreover, the present application contemplates a content compilation as including a hierarchy of content combinations in which individual content items in the form of video clips, news items, still images, graphics, or samples of audio tracks, for example, are aggregated into content subsets each relating a consistent "narrative" story, based on their relevance to one another and a known end-user preference. Those content subsets or "stories" may then be grouped, such as by being strung together, i.e., concatenated, to produce a content compilation or "narrative experience" having a narrative arc determined by the sequence in which the content subsets are combined to form the content compilation.

It is noted that, as used in the present application, the expression "narrative experience" refers to a customized compilation of video clips, graphics, audio, dynamically generated text or other creative elements that are relevant to and individual end-user or a group of end-users. As one non-limiting example, a narrative experience may take the form of a personalized sports news show, featuring a compilation of highlight clips relevant to the players and teams preferred by the end-user(s), logos relevant to the teams and leagues preferred by the end-user(s), and dynamically generated audio and motion graphics capturing the sports news stories most relevant to the preferences of the end-user(s) and driven by other parameters, such as recency for instance. As another non-limiting example, a narrative experience may take the form of a marketing video for a theme park, featuring video footage and photos of the end-user(s) captured on favorite theme park rides from past visits, stock footage of the resort where the end-user(s) stayed and the parks they visited, and dynamically generated text and motion graphics capturing dates, locations, and other details of the visit.

FIG. 1 shows an exemplary system for curating narrative experiences through automated content compilation, according to one implementation. As shown in FIG. 1, content compilation system 100 includes computing platform 102 having hardware processor 104 and system memory 106 implemented as a non-transitory storage device. According to the present exemplary implementation, system memory 106 stores software code 110 including trained machine learning model 112, editorial interface 114 provided by software code 110, consumption profile database 120, and compilation authoring database 130. Also shown in FIG. 1 are dataset 132 of content authoring data, and individual end-user consumption profiles 122a, 122b, and 122c stored in consumption profile database 120.

As further shown in FIG. 1, content compilation system 100 is implemented within a use environment including communication network 108, client system 136 including display 138, end-users 124 including individual end users 124a, 124b, and 124c, human editor 126 other than one of end-users 124, and content sources 140a, 140b, and 140c (hereinafter "content sources 140a-140c"). In addition. FIG. 1 shows network communication links 118 of communication network 108 interactively linking content compilation system 100 with client system 136, content sources 140a-140c, and end-users 124. Also shown in FIG. 1 are authoring data 128, content items 142a, 142b, and 142c (hereinafter "content items 142a-142c") obtained by content compilation system 100 from respective content sources 140a-140c, one or more content compilations 144 (hereinafter "content compilation(s) 144") produced by content compilation system 100, and feedback data 146 received from one or more of end-users 124 and rating the actual desirability of content compilation(s) 144 to the end-user(s).

It is further noted that although FIG. 1 shows three content sources and three end-users, that representation is merely exemplary. In other implementations, as few as one content source, or more than three content sources may provide content items for automated compilation by content compilation system 100. Moreover, end users 124 would typically include many more than three individual end-users, such as thousands, tens of thousands, or hundreds of thousands of end-users, for example.

It is also noted that although FIG. 1 shows a single client system used by a single human editor, it is contemplated that in many implementations multiple client systems may be utilized by multiple different human editors to interact with content compilation system 100 substantially concurrently. Consequently, client system 136 and human editor 126 correspond respectively to one, or more than one client system and one, or more than one human editor.

Although FIG. 1 depicts software code 110, consumer profile database 120, and compilation authoring database 130 as being stored in system memory 106, that representation too is merely exemplary. More generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110, consumer profile database 120, and compilation authoring database 130 as being co-located in system memory 106, that representation is also merely provided as an aid to conceptual clarity. More generally, content compilation system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within content compilation system 100.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Consequently, in some implementations, software code 110, consumer profile database 120, and compilation authoring database 130 may be stored remotely from one another on the distributed memory resources of content compilation system 100.

Although client system 136 is shown as a desktop computer in FIG. 1, that representation is also provided merely as an example. More generally, client system 136 may be any suitable mobile or stationary communication device or system that implements data processing capabilities sufficient to support connections to communication network 108, enable use of editorial interface 114, and implement the functionality ascribed to client system 136 herein. For example, in other implementations, client system 136 may take the form of a laptop computer, a tablet computer, or a smartphone, for example.

Human editor 126 may be authorized to utilize client system 136, and editorial interface 114 rendered on display 138 of client system 136, to guide authoring of content compilations by content compilation system 100. Display 138 of client system 136 may take the form of a liquid crystal display (LCD), a light-emitting diode (LED) display, an organic light-emitting diode (OLED) display, a quantum dot (QD) display, or any other suitable display screen that performs a physical transformation of signals to light.

By way of overview, the present content compilation solution creates a virtuous circle between algorithmic content compilation by software code 110, executed by hardware processor 104, and authoring data inputs provided by human editor 126 via editorial interface 114. In some implementations, human editor 126 can receive substantially instant feedback on manual story creation in the form of a predicted end-user desirability score and automated suggestions of higher scoring story compilations put together by trained machine learning model 112 of software code 110. This advantageously enables human editor 126 to discover content combinations that were unintuitive to human editor 126 but may be desirable to one or more of end-users 124, and to learn more effective narrative arcs based on real-world consumption data or feedback data 146. By capturing metadata around the human editorial authoring process, trained machine learning model 112 can learn new starting story templates, improve compilation scoring mechanisms, and refine the editorial style of human editor 126 by testing and adjusting authoring criteria, leading to more effective compilation authoring templates.

Compilation scoring mechanisms may be further improved based on a feedback loop utilized by trained machine learning model 112 to progressively improve its performance. For example, weighting factors used to compute the desirability score for a content compilation may become progressively more accurate due to adjustments made by trained machine learning model 112 in response to feedback data 146 received from end-users 124 and rating the actual desirability of the content compilation to a particular end-user or group of end-users. That is to say, trained machine learning model 112 can utilize feedback data 146 to advantageously improve the automated performance by content compilation system 100 in the future.

By running software code 110 on new content items as such content becomes available, a process is created that automatically constructs high-value content compilations, and once the predicted desirability score satisfies a predetermined threshold, the content compilation can be pushed or otherwise provided to an individual end-user or to a group of end-users, which advantageously eliminates the need for the end-user(s) to explicitly request the content compilation. Additionally, the present automated content compilation solution allows the production and delivery of individualized content compilations that target a single end-user or a group or end-users uniquely, rather than conventional approaches in which content is produced based on collective interests of a particular demographic population.

For instance, rather than having a human editor create a generic combination of content targeting a demographic of male basketball fans in a certain age range who live in the Los Angeles, California area, the present solution can be implemented to produce and deliver a different narrative experience for each of the individuals who make up that demographic by mixing content relevant to other personalized characteristics, preferences, future plans, and consumption patterns, as well as by crossing outside the boundaries of a single subject area (e.g., basketball) to including related topics and affinities. This may significantly benefit the end-user(s) by relieving them of the requirement of finding personalized content piecemeal from multiple content sources.

As a specific example, the present solution enables the automated compilation of a narrative experience containing information relevant to the present status of a pandemic in Florida as it relates to the vacation plans of a Los Angeles resident end-user(s), weaving into that narrative experience information about vacation plans to visit a Florida based theme park at that time. In addition, the content compiled into the end-user(s) specific narrative experience may include information regarding a sporting event involving a favorite team, a weather forecast for that event, and any other relevant content items without the end-user(s) having to consult several applications or visit several websites to gather the related but distinctively sourced content automatically compiled according to the present novel and inventive concepts.

Thus, content compilations can advantageously be produced and delivered based on the end user's affinities. For instance, while a generic sports highlight package might attempt to appease fans of both teams competing in a sporting event, present content compilation solution produces narrative experiences that are consistent with the sentiments of the end-user(s) by emphasizing content items that relate to their preferences while avoiding the inclusion of content that relates to counter-preferences. This can result in the production of content compilations in the form of multiple highlight packages that are hyper-focused to the end-user(s), limited only by the granularity of the content items and specificity of the metadata as it relates to preferences.

Figure 2A:
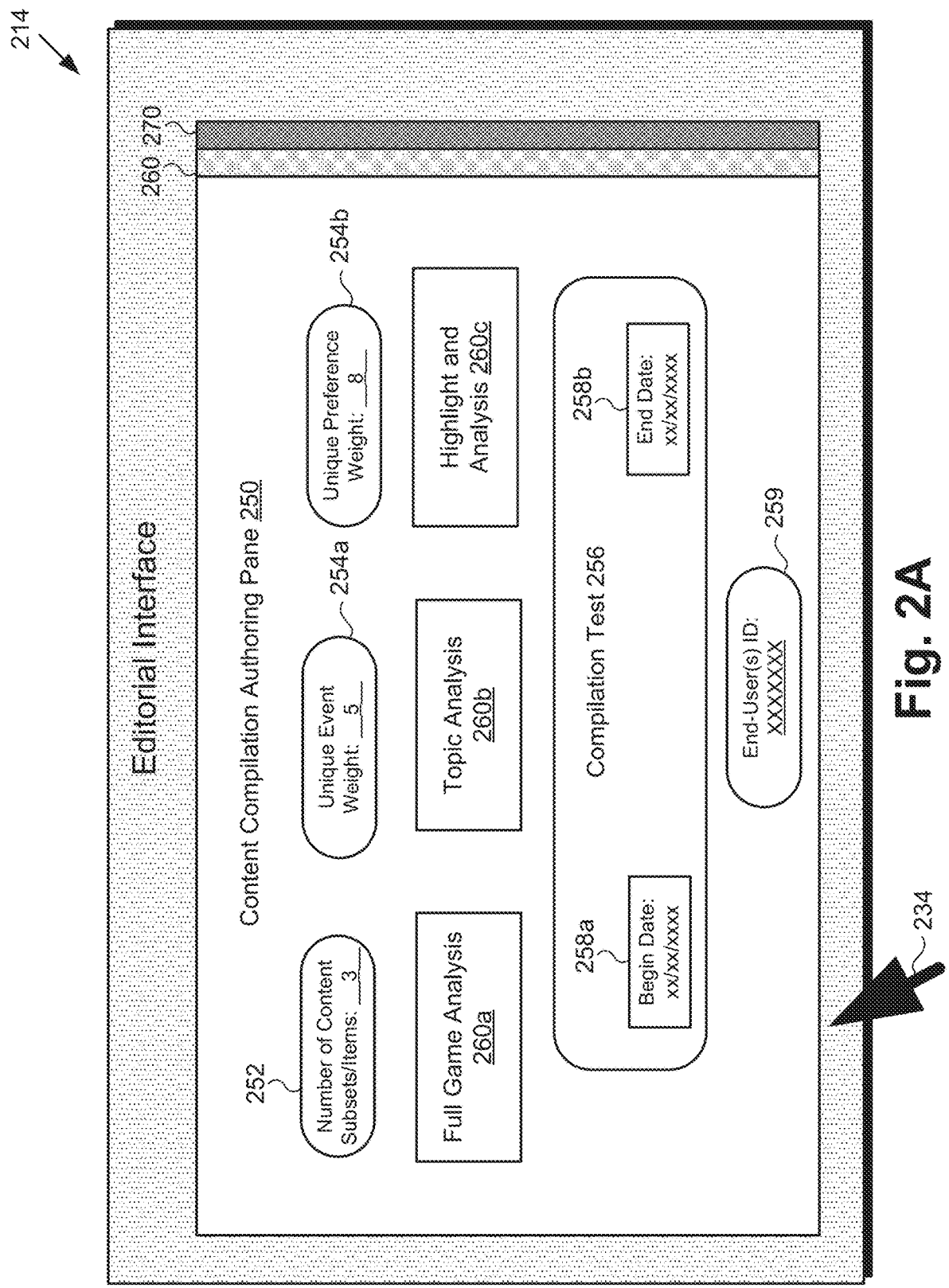
FIG. 2A shows a content compilation authoring pane of an editorial interface provided by the content compilation system shown in FIG. 1, according to one implementation.

FIG. 2A shows exemplary content compilation authoring pane 250 of editorial interface 214 according to one implementation. Also shown as background panes in FIG. 2A, are content subset authoring pane 260 and content item selection pane 270, each including fields that can be populated or modified by human editor 126 as described below, as well as end-user(s) ID field 259 identifying a particular one of end-users 124, or a particular subgroup of end-users 124 for whom content compilation(s) 144 being authored using editorial interface 214 is/are intended. It is noted that content compilation authoring pane 250 depicts the compilation of various types of sports content for merely exemplary purposes. As noted above, the present content compilation solution is applicable to digital media content in a variety of forms, including audio-video content, video content without audio, audio content without video, such as music for instance, still images, graphics, such as sports or weather statistics, and text, to name some examples.

According to the exemplary implementation shown in FIG. 2A, individual content items in the form of video clips, news items, still images, graphics, or samples of audio tracks, for example, have been aggregated into content subsets 260a, 260b, and 260c each having a specific focus. Thus, content subset 260a includes a full game analysis of a sporting event such as a specific collegiate or professional basketball game, while content subset 260b includes content that addresses the sports topic more generally, such as the top players in the running to receive a league award for the sport analyzed in content subset 260a. Content subset 260c, by contrast may include video highlights of other games played the same day, as well as interviews with key players or coaches from other teams, for example.

As shown in FIG. 2A, content compilation authoring pane 250 may include field 252 identifying the number of content subsets, or the number of content items, available for use in producing a content compilation. In addition, fields 254a and 254b identify weighting factors applied in evaluating and organizing content subsets 260a, 260b, and 260c. For example, using a weighting range of 1 (lowest weight) to 10 (highest weight), FIG. 2A shows that unique preference weight 254*b* is most determinative in the selection and organization of content subsets 260*a*, 260*b*, and 260*c*.

Unique preference weight 254*b* may specify how varied content subsets 260*a*, 260*b*, and 260*c* included in one of content compilation(s) 144 should be. That is to say, unique preference weight 254*b* enables the scoring mechanism applied to a content compilation to take into account how individual content subsets 260*a*, 260*b*, and 260*c* influence the score of the content compilation as a whole. For example, if all content subsets corresponding to end-user(s) preferences have been included, a particular content compilation will receive a higher desirability score if the content included in the content compilation is more varied (e.g., a variety of different teams playing, a sports content subset followed by a weather report or news item rather than all sports clips of the same team or featuring the same player). Alternatively, or in addition, in some implementations, unique preference weight 254*b* may be used to identify combinations of content subsets 260*a*, 260*b*, 260*c* that are likely to appeal to a diversity of user preferences of the end-user(s), e.g., more variation in the user preferences that trained machine learning model 112 is matching on.

Content subsets or "stories" 260*a*, 260*b*, and 260*c* may then be grouped, such as by being strung together, i.e., concatenated, to produce a content compilation or "narrative experience" having a narrative arc determined by the sequence in which content subsets are combined in the content compilation, i.e., content subset 260*a* followed by content subset 260*b* followed by content subset 260*c*. Also shown in FIG. 2A is content subset authoring pane 260, which a human editor, such as human editor 126 in FIG. 1, may access by clicking through any one of content subsets 260*a*, 260*b*, 260*c* using input device 234, which as shown as an exemplary cursor in FIG. 2A.

In some implementations, human editor 126 can receive substantially instant feedback on manual story creation in the form of a predicted end-user desirability score or automated suggestions for higher scoring story compilations put together by trained machine learning model 112 of software code 110 through use of compilation test engine 256. This advantageously enables human editor 126 to discover content combinations that may be unintuitive to human editor 126 but desirable to one or more of end-users 124, and to learn more effective narrative arcs. For example, human editor 126 may enter a beginning data in begin date field 258*a* and an ending data in end date field 258*b*, and compilation test engine 256 may use those beginning and end dates and combinations of two or more of content subsets 260*a*, 260*b*, and 260*c* to test the predicted desirability of various content compilations for one or more of end-users 124.

Figure 2B:
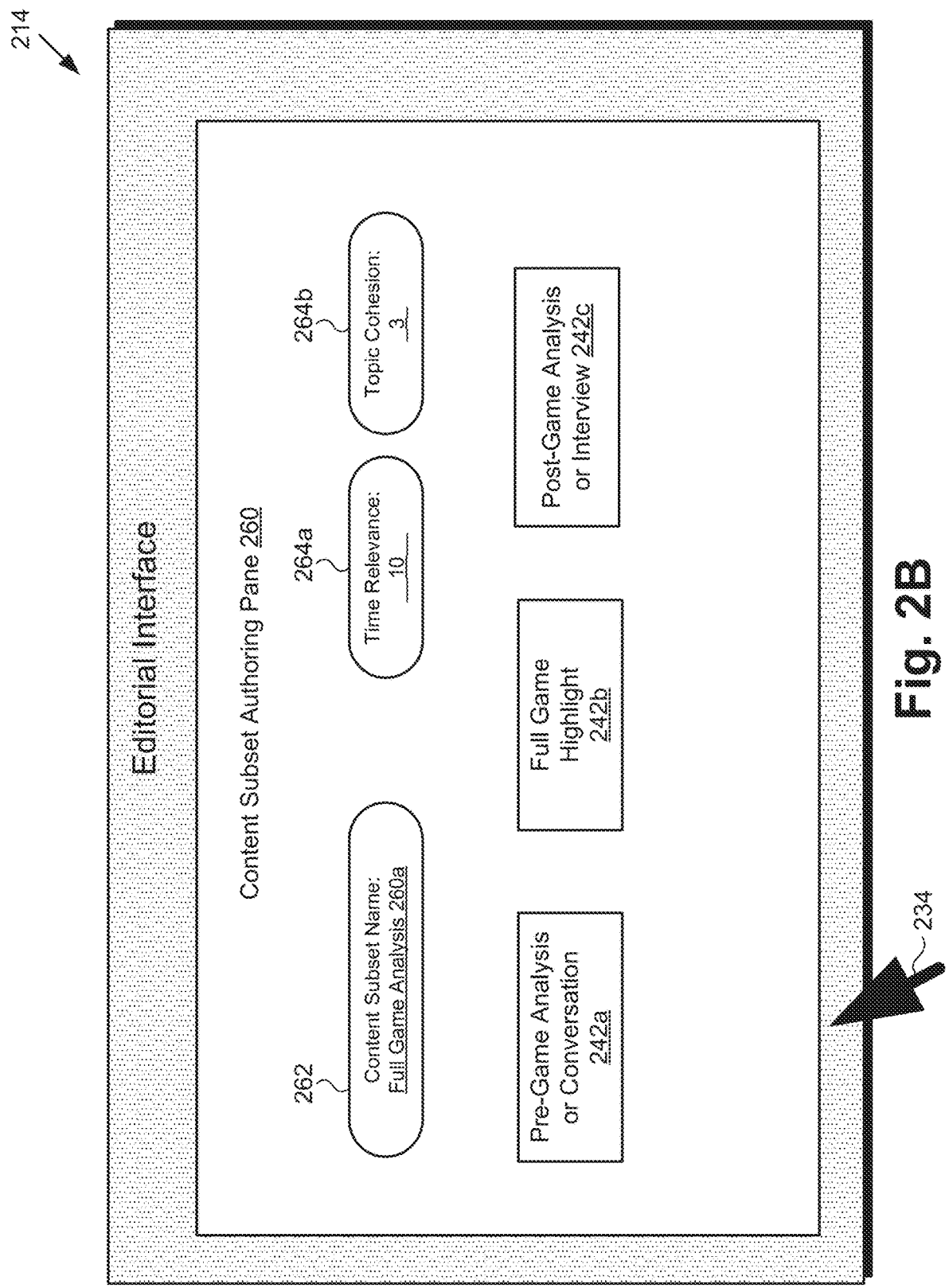
FIG. 2B shows a content subset authoring pane of the editorial interface shown in FIG. 2A, according to one implementation.

Referring to FIG. 2B, FIG. 2B shows content subset authoring pane 260 of editorial interface 214, according to one implementation. According to the exemplary implementation shown in FIG. 2B, content subset authoring pane 260 is being used to aggregate content items 242*a*, 242*b*, and 242*c* to produce full game analysis content subset 260*a*, as indicated by content subset name field 262. Also shown in FIG. 2B are fields 264*a* and 264*b* identifying weighting factors applied in evaluating and organizing content items 242*a*, 242*b*, and 242*c*. For example, using a weighting range of 1 (lowest weight) to 10 (highest weight), FIG. 2B shows that time relevance weight 264*a* is most determinative in the selection and organization of content items 242*a*, 242*b*, and 242*c*, while topic cohesion weight 264*b* corresponding to the relatedness of content items 242*a*, 242*b*, 242*c*, i.e., their direct relevance to one another, is less important.

Figure 2C:
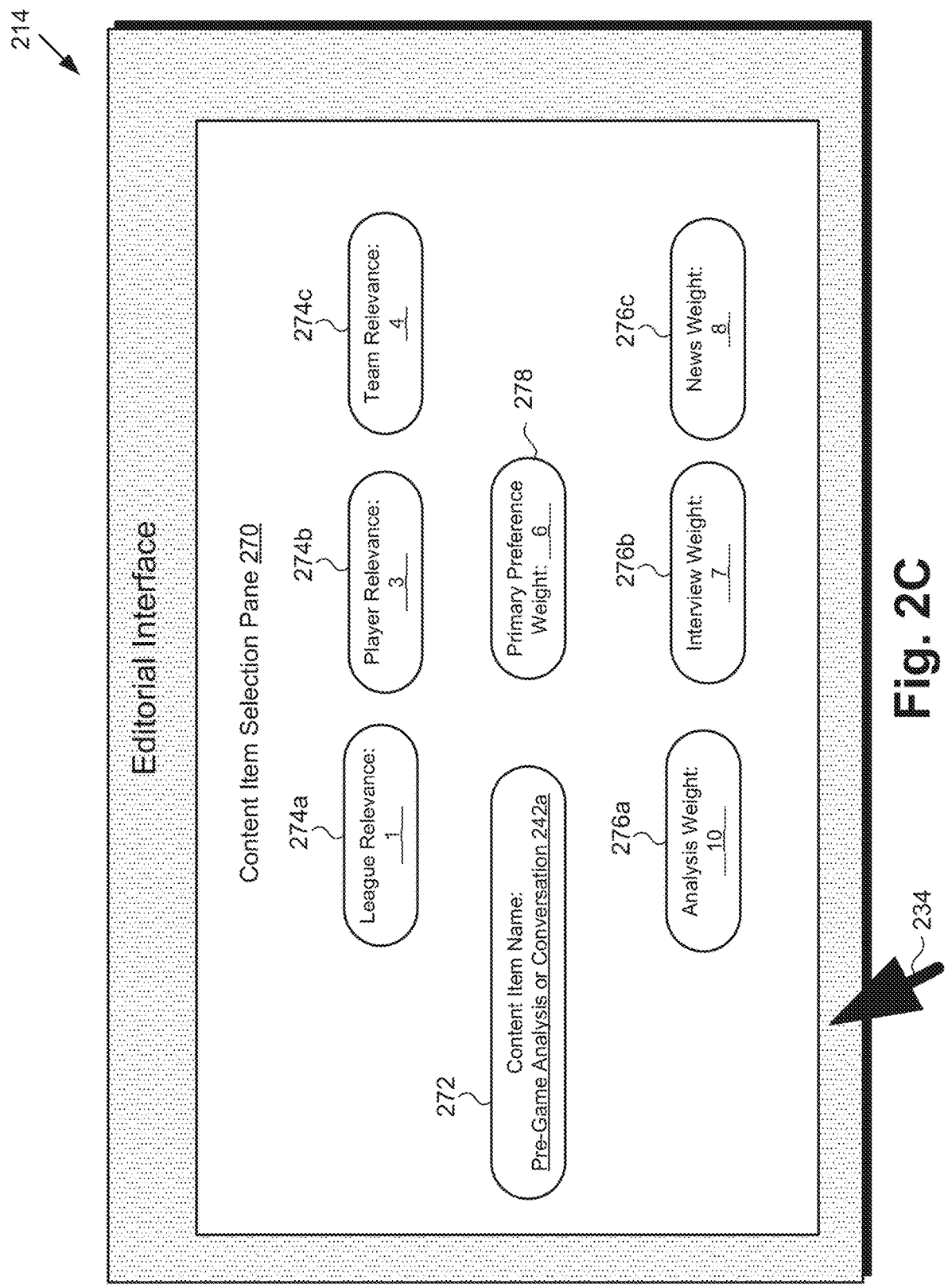
FIG. 2C shows a content item selection pane of the editorial interface shown in FIGS. 2A and 2B, according to one implementation.

FIG. 2C shows content item selection pane 270 of editorial interface 214, according to one implementation. According to the exemplary implementation shown in FIG. 2C, content item selection pane 270 is being used to automate the selection of content to be included in Pre-Game Analysis or Conversation content item 242*a*, as indicated by content item name field 272. Also shown in FIG. 2C are fields 274*a*, 274*b*, and 274*c* identifying weighting factors applied in evaluating the importance of matching a user's preference for a particular sports league, player, and team, respectively, when selecting content for inclusion in content item 242*a*. In addition, FIG. 2C shows content weighting fields 276*a*, 276*b*, and 276*c* indicating the priority given to content in the form of analysis, interviews, and news content, respectively, as well as primary preference weight 278.

Regarding primary preference weight 278, it is noted that if a content item is determined to have a primary preference association, such as in the case of a sporting event where one team or player is highlighted in the clip even though multiple players and teams are involved in the content, primary preference weight 278 may be used to select content with more emphasis on a user's particular preference, e.g., preferring highlights where a favorite player is scoring but omitting highlights where the player appears in the clip but is not the focal point. In other words, primary preference weight 278 demonstrates that individual content items can be chosen based on the weight of individual tags as they pertain to that specific item of content.

Editorial interface 214 in FIGS. 2A, 2B, and 2C corresponds in general to editorial interface 114, in FIG. 1. That is to say, editorial interface 114 may share any of the characteristics attributed to corresponding editorial interface 214 by the present disclosure, and vice versa. Thus, although not shown in FIG. 1, editorial interface 114 may include content item selection pane 270, content subset authoring pane 260, content compilation authoring pane 250, and any of the features shown and described by reference to FIGS. 2A, 2B, and 2C. In addition, content items 242*a*, 242*b*, and 242*c* correspond respectively in general to content items 142*a*-142*c*, in FIG. 1, and those corresponding features may share any of the characteristics attributed to either corresponding feature by the present disclosure.

Figure 3:
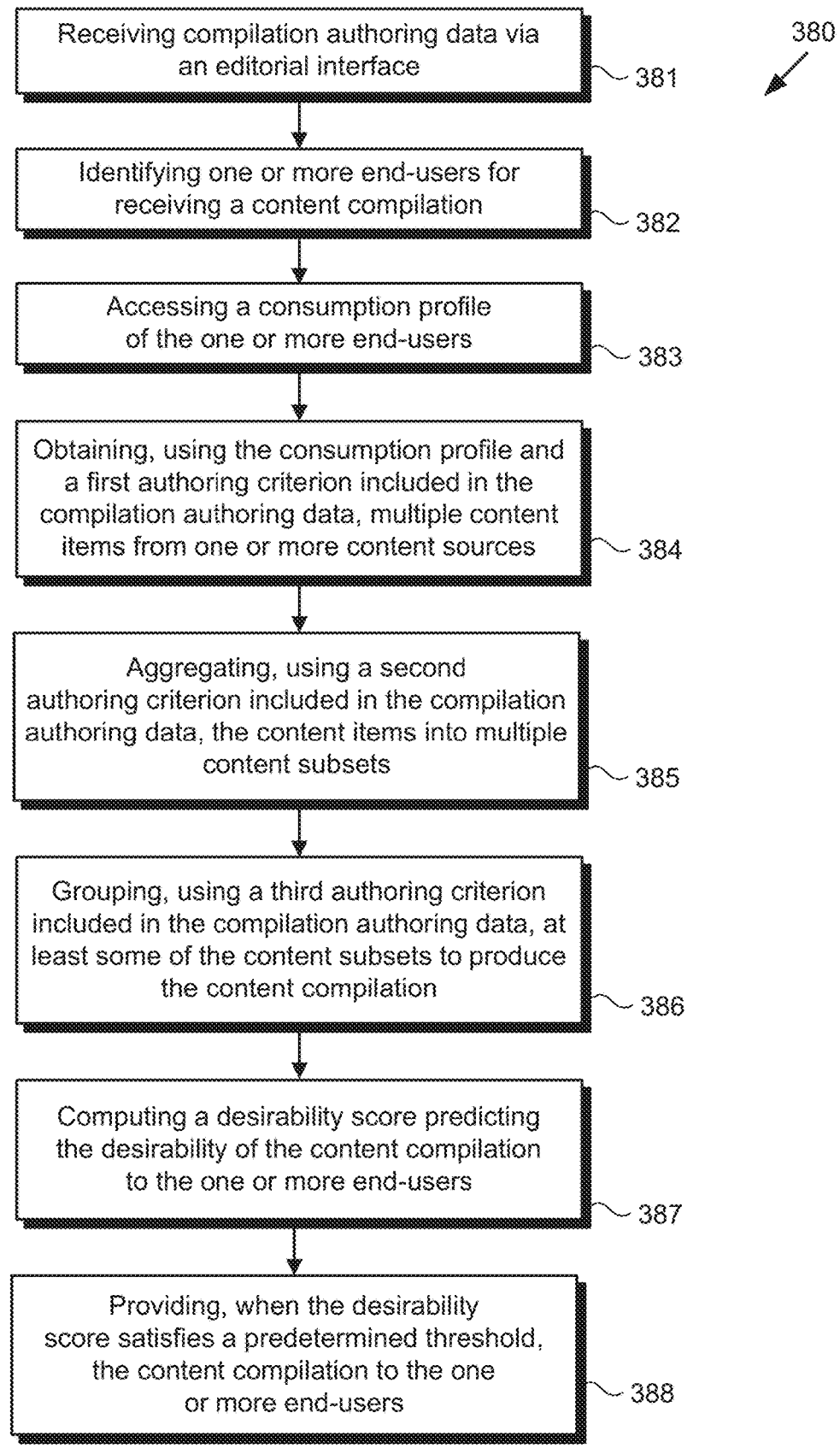
FIG. 3 shows a flowchart presenting an exemplary method for curating a narrative experience through automated content compilation, according to one implementation.

The functionality of software code 110 including trained machine learning model will be further described by reference to FIG. 3. FIG. 3 shows flowchart 380 presenting an exemplary method for use by a system, such as content compilation system 100, in FIG. 1, for curating a narrative experience through automated content compilation, according to one implementation. With respect to the method outlined in FIG. 3, it is noted that certain details and features have been left out of flowchart 380 in order not to obscure the discussion of the inventive features in the present application.

Referring to FIG. 3 in combination with FIGS. 1, 2A, 2B, and 2C, flowchart 380 begins with receiving compilation authoring data 128 via editorial interface 114/214 (action 381). Compilation authoring data 128 may include some or all of the information included in field 252, in FIG. 2A, the weighting factors included in fields 254*a* and 254*b*, and data entered into end-user(s) ID field 259 in that same figure, as well as the weighting factors included in fields 264*a* and 264*b*, in FIG. 2B, for example.

As shown by FIG. 1, compilation authoring data 128 may be entered into editorial interface 114/214 by human editor 126, and may be received from client system 136 via communication network 108 and network communication links 118. Compilation authoring data 128 may be received by software code 110, executed by hardware processor 104 of computing platform 102.

Flowchart 380 continues with identifying end-user(s) for receiving content compilation(s) 144 (action 382). In some implementations, the end-user(s) for receiving content compilation(s) 144 may be a subgroup of end-users 124, based on their shared interest in the same subject matter, or due to their all being fans of the same sport or sports organization, for example. That is to say, the end-user(s) identified in action 144 may include a group of end-users, e.g., a subgroup of end-users 124, such as a group of consumers, a family, a group residing in a particular geographical region, fans of a particular team, or any other affinity group. However, in other implementations, content compilation(s) 144 may be individualized for delivery to a single one of end-users 124, such as end-user 124a, but not end-users 124b or 124c.

Figure 4:
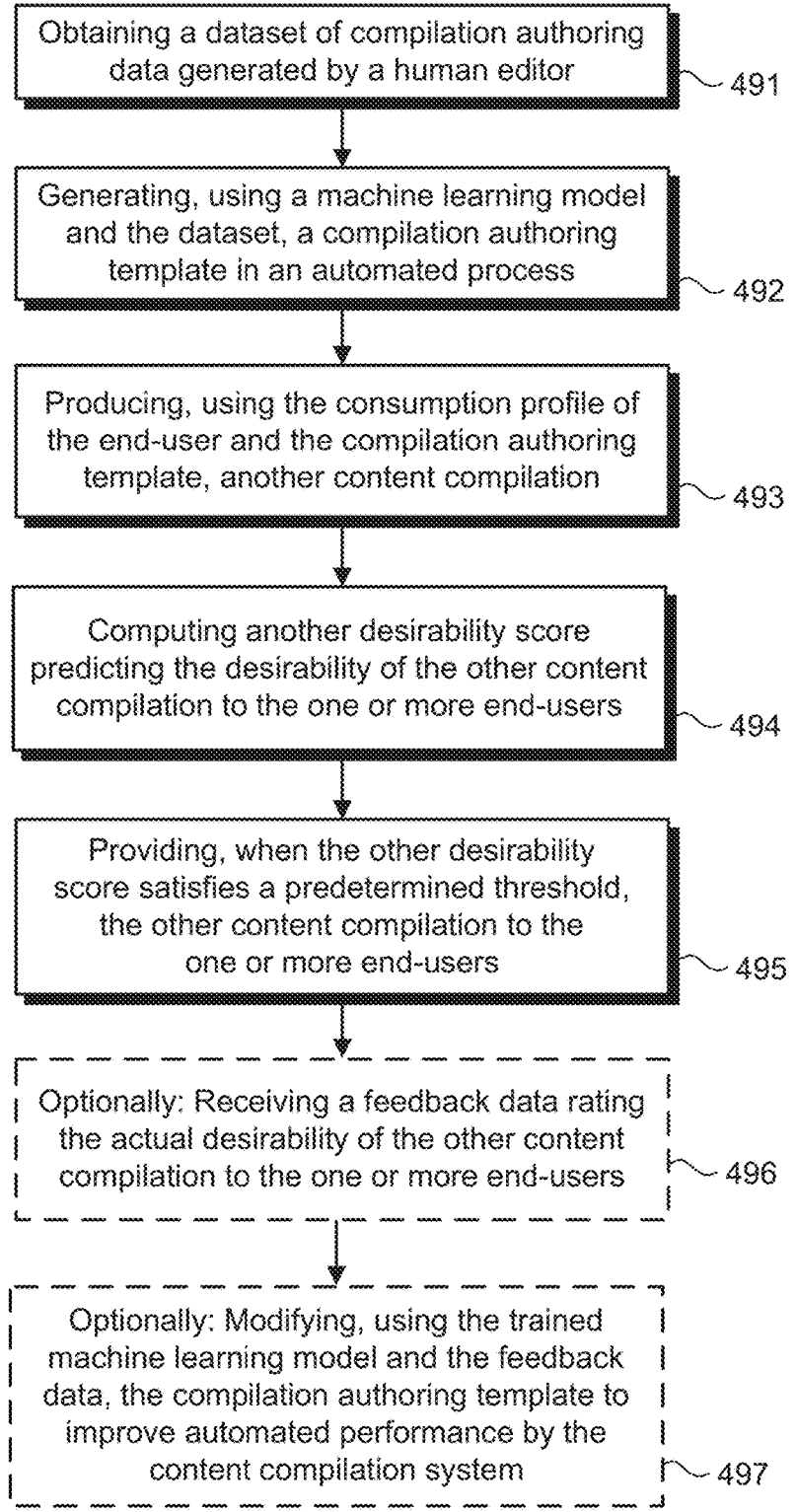
FIG. 4 shows a flowchart presenting exemplary actions for extending the method presented in FIG. 3.

In the interests of conceptual clarity, action 382, as well as actions 383-388 and the additional actions included in FIG. 4, are further described by reference to an exemplary use case in which content compilation(s) 144 is/are produced for end-user 124a alone. Moreover, according to the exemplary use case described below, a consumption profile of end-user 124 is stored as end-user consumption profile 122a in consumption profile database 120. In some implementations, end-user 124a for receiving content compilation(s) 144 may be identified in action 382 using data included in end-user(s) ID field 259, in FIG. 2A. However, in other implementations, end-user 124a may be identified in action 382 through an automated back-end process that does not rely on population of end-user(s) ID field 259. In those latter implementations, field 259 may be used for testing purposes, for example to assist human editor 126 discover new, higher scoring content compilation(s) 144, or to target groups of end-users 124 including end-user 124a, rather than end-user 124a individually. End-user 124a may be identified by software code 110, executed by hardware processor 104 of computing platform 102.

Flowchart 380 continues with accessing consumption profile 122a of end-user 124a (action 383). End-user consumption profile 122a may include the content consumption history of end-user 124a, preferences of end-user 124a, demographic information such as the age, gender, and geographical location of end-user 124a, content subscriptions held by end-user 124a, affinity groups or loyalty programs participated in by end-user 124a, as well as miscellaneous information entered into end-user consumption profile 122a by end-user 124a, such as birthdays, travel plans, or subjects of special interest, for example. In addition, in some implementations, end-user consumption profile 122a may include information automatically detected by a communication device utilized by end-user 124a. For example, localization data, such as Global Positioning System (GPS) data collected by the communication device utilized by end-user 124a for instance, may be included in end-user consumption profile 122a and may be used to identify a present or past location of end-user 124a. Alternatively, or in addition, accelerometer or gyroscope data collected by the communication device utilized by end-user 124a may indicate that end-user 124a is in motion, and may be presently physically active, commuting, traveling, or otherwise in transit.

End-user consumption profile 122a of end-user 124a may be accessed on consumption profile database 120 by software code 110, executed by hardware processor 104 of computing platform 102. In implementations in which consumption profile database 120 and software code 110 are co-located in system memory 106, hardware processor 104 may execute software code 110 to access end-user consumption profile 122a directly. However, in implementations in which consumption profile database 120 is stored remotely from software code 110, hardware processor 104 may execute software code 110 to access end-user consumption profile 122a via communication network 108 and network communication links 118.

Flowchart 380 continues with obtaining, using end-user consumption profile 122a and a first authoring criterion included in compilation authoring data 128, some or all of content items 142a/242a, 142b/242b, and 142c/242c from one or more of content sources 140a-140c (action 384). It is noted that although FIG. 1 depicts content item 142a/242a being obtained from content source 140a, content item 142b/242b being obtained from content source 140b, and content item 142c/242c being obtained from content source 140c, that representation is merely exemplary. In other implementations some or all of content items 142a/242a, 142b/242b, and 142c/242c may be obtained from the same content source, e.g., one of content sources 140a-140c. In other implementations, content items 142a/242a, 142b/242b, and 142c/242c may be obtained from more than one, but less than all of content sources 140a-140c.

The first authoring criterion used in action 384 may include the determination of one or more of an end-user relevance score, a relative timing score, or a consumer popularity score for each of content items 142a/242a, 142b/242b, and 142c/242c, for example. The end-user relevance score may be determined based on the subject matter of each of content items 142a/242a, 142b/242b, and 142c/242c relative to known preferences of end-user 124a, as well as a content consumption history of end-user 124a. The relative timing score may be determined based on time offsets among individual content items 142a/242a, 142b/242b, and 142c/242c. As a specific example, where content item 142b/242b is a full game highlight clip of a particular sporting event, it may be advantageous or desirable for content items 142a/242a and 142c/242c to precede or follow the subject matter included in content item 142b/242b in time, but not to coincide with it. Thus, content from pre-game analysis or conversations may earn a high relative timing score for use as content item 142a/242a, while post-game analysis or interviews may earn a high relative timing score for use as content item 142c/242c.

The consumer popularity score may be based on the number of views or hits a particular content item has received from a general consumer population, or from a subgroup of consumers, such as fans of a particular team, or consumers sharing similar demographic characteristics. It is noted that even in use cases in which consumption profile database 120 does not include a consumption history specific to end-user 124a, collaborative filtering recommendation techniques can be used to identify content items 142a/242a, 142b/242b, and 142c/242c to be obtained in action 384. That is to say, in some implementations, content items 142a/242a, 142b/242b, and 142c/242c may be identified and obtained by reference to a consumption profile of a demographic of end-users 124 determined to be similar to end-user 124a. For example, content items 142a/242a, 142b/242b, and 142c/242c may be identified and obtained based on information such as the age, gender, and geographical location of end-user 124a and consumption history information for end-users 124 having a similar age and geographical location, and the same gender. Content items 142a/242a, 142b/242b, and 142c/242c may be obtained from one or more of content sources 140a-140c in action 384 by software code 110, executed by hardware processor 104 of computing platform 102.

As noted above, content items 142a/242a, 142b/242b, and 142c/242c may take a variety of forms. For instance, content items 142a/242a, 142b/242b, and 142c/242c may be audio-visual content, such as a movie, TV, news, weather, or sports clip. As a result, in some implementations, content items 142a/242a, 142b/242b, and 142c/242c may be video clips. Alternatively, in some implementations, one or more of content items 142a/242a, 142b/242b, and 142c/242c may be music or other audio samples, passages quoted from digital print media, or one or more graphical elements or overlays.

It is further noted that, in some implementations, content items 142a/242a, 142b/242b, and 142c/242c may include content having a short duration. For example, where content items 142a/242a, 142b/242b, and 142c/242c are video clips, content items 142a/242a, 142b/242b, and 142c/242c may have a playout duration of a few seconds, such as approximately ten to fifteen seconds, for example, or may be limited to one or a few shots of video.

As used in the present application, a "shot" refers to a sequence of video frames that is captured from a unique camera perspective without cuts and other cinematic transitions. Thus, in one implementation, one or more of content items 142a/242a, 142b/242b, and 142c/242c may correspond to a single shot of video content including multiple individual frames of video. However, in other implementations, one or more of content items 142a/242a, 142b/242b, and 142c/242c may correspond to a content segment including multiple shots.

Flowchart 380 continues with aggregating, using a second authoring criterion included in compilation authoring data 128, content items 142a/242a, 142b/242b, and 142c/242c into multiple content subsets 260a, 260b, 260c (action 385). The second authoring criterion used in action 385 may include the determination of a content compatibility score for each of subsets 260a, 260b, and 260c. For example, referring to FIG. 2A, field 254a includes a relatively high (i.e., 8/10) weighting factor being applied to the importance of content included in content compilation being relevant to the same unique event, such as a particular sporting event. Thus, the content compatibility score determined as part of the second authoring criterion used in action 385 may be higher for aggregations of content subsets 260a, 260b, and 260c that are topically related but not conflicting by overlapping in time or having a sentiment counter to known preferences of end-user 124a.

Each content subset 260a, 260b, and 260c may correspond to a story assembled or aggregated from multiple content items drawn to the same or similar subject matter and theme. For example, as described above by reference to FIG. 2A, content subset 260a may include a full game analysis of a sporting event such as a specific collegiate or professional basketball game, while content subset 260b includes content that addresses the sports topic more generally, such as top players in the running to receive a league award for the sport analyzed in content subset 260a. Content subset 260c, by contrast, may include video highlights of other games played the same day, as well as interviews with key players or coaches from other teams, for example. Content subsets 260a, 260b, and 260c may be aggregated from content items, such as content items 142a/242a, 142b/242b, and 142c/242c for example, by software code 110, executed by hardware processor 104 of computing platform 102.

Flowchart 380 continues with grouping, using a third authoring criterion included in compilation authoring data 128, at least some of content subsets 260a, 260b, and 260c to produce content compilation(s) 144 (action 386). The third authoring criterion used in action 386 may include the determination of a content variety score for content compilation(s) 144. For instance, while it may be desirable in the interests of narrative flow for content subsets 260a, 260b, and 260c to be consistent with one another topically, it may also be desirable to ensure that content subsets 260a, 260b, and 260c address the same or similar topics from different perspectives, or impart different types of information. As a specific example, and as noted above, content compilation(s) 144 may include varied information such as the present status of a pandemic in Florida as it relates to the vacation plans of a Los Angeles resident end-user 124a, as well as information about that end-user's vacation plans to visit a Florida based theme park at that time, weather forecast information for the upcoming trip, as well as information regarding a sporting event or team of special interest to end-user 124a.

Regarding determination of the content variety score, such a score may take into account (but is not limited to) the following features: 1) The aggregated individual scores of content subsets 260a, 260b and 260c (which could be weighted—for example, a content subset with a longer duration might have a stronger weight) and 2) the similarity or uniqueness between content subsets 260a, 260b and 260c, which could be computed using different metadata parameters as drivers, for example, whether they contain one or more of the same "topic" or "theme" tag, a tag for the same "sport," and a unique identifier indicating that they relate to the same "event." Alternatively, or in addition, the content variety score may take into account one or more of: 3) the aggregated length of the entire content compilation or the relative lengths of the content subsets contained therein, and 4) the aggregated recency of the entire content compilation or the relative temporal ordering of the content subsets contained it contains, for example whether the content subsets are sorted into a natural chronological order.

In addition to, or as alternatives to the content variety score described above, the third authoring criterion included in compilation authoring data 128 may include one or more of the number of content subsets to be included in content compilation(s) 144, the type of content subsets to be included in content compilation(s) 144 (which are in turn defined by their component videos, creative elements, recency, similarity and other parameters), the selection of individual creative elements (such as graphical or audio transitions) to maximize continuity between the content subsets, and the logical ordering of content subsets to be included in content compilation(s) 144 (such as chronological or reverse chronological order, ordering based on duration, or grouping subsets relating to the same theme or entity together), to name a few examples.

Thus the number, ordering, relevance, and variety of at least some of content subsets 260a, 260b, and 260c included in content compilation(s) 144 may be used to individualize content compilation(s) 144 for end-user 124a based on end-user consumption profile 122a of end-user 124a. Moreover, in some implementations, content compilation(s) 144 may be individualized for end-user 124a so as to be unique to end-user 124a. Content subsets 260a, 260b, and 260c may be grouped to produce content compilation(s) 144 in action 386 by software code 110, executed by hardware processor 104 of computing platform 102.

It is noted that although flowchart 380 shows each of actions 385 and 386 as occurring once, and further shows action 385 as preceding action 386, that representation is merely exemplary. In some implementations, one or both of actions 385 and 386 may be repeated multiple times prior to action 387 described below. Moreover, in some implementations, the order of those multiple iterations of actions 385 and 386 may alternate. As one example, action 385 may be performed repeatedly to first aggregate content items 142a/242a, 142b/242b, and 142c/242c into content subsets 260a, 260b, and 260c, may then proceed with aggregating one or more of content subsets 260a, 260b, and 260c into content supersets, and may further continue with aggregating those supersets into super-supersets prior to action 386. Alternatively, in some implementations, actions 385 and 386 may initially occur as outlined by flowchart 380, but may be followed by repetition of action 385, or action 386, or actions 385 and 386 one or more times prior to action 387.

Flowchart 380 continues with computing a desirability score predicting the desirability of content compilation(s) 144 to end-user 124a (action 387). In some implementations, the desirability score computed in action 387 may include some or all of the scores determined in actions 384, 385, and 386. Thus, the desirability score may include some or all of the variety score, the content compatibility score, and the one or more of the end-user relevance score, the relative timing score, or the consumer popularity score described above.

In some implementations, the desirability score computed in action 387 may be an unweighted sum of the scores determined in action 384, 385, and 386. In other implementations, however, the desirability score computed in action 387 may be a weighted sum (which may include negative as well as positive weighting factors) of the scores determined in action 384, 385, and 386. That is to say, in some implementations, the desirability score predicting the desirability of content compilation(s) 144 to end-user 124a may be higher than, or lower than, the sum of the variety score, the content compatibility score, and the one or more of the end-user relevance score, the relative timing score, or the consumer popularity score. Computation of the desirability score in action 387 may be performed by software code 110, executed by hardware processor 104 of computing platform 102.

Flowchart 380 can conclude with providing, when the desirability score computed in action 387 satisfies a predetermined threshold, content compilation(s) 144 to end-user 124a (action 388). In one implementation, providing content compilation(s) 144 to end-user 124a may include pushing content compilation(s) 144 to end user 124a over communication network 108 and network communication links 118. That is to say, content compilation system 100 may provide end-user 124a with a push notification informing end-user 124a that content compilation(s) 144 is/are available. Hardware processor 104 may then execute software code 110 to stream content compilation(s) 144 to end-user 124a via communication network 108 and network communication links 118. Conditioning action 388 on the desirability score of content compilation(s) 144 satisfying a predetermined threshold advantageously prevents providing content to end-user 124a that end-user 124a may find irrelevant or otherwise undesirable.

Referring to FIG. 4, FIG. 4 shows flowchart 490 presenting exemplary actions for extending the method outlined by flowchart 380, in FIG. 3. With respect to the actions listed in FIG. 4, it is noted that certain details and features have been left out of flowchart 490 in order not to obscure the discussion of the inventive features in the present application.

Flowchart 490 begins with obtaining dataset 132 of compilation authoring data generated by human editor 126 (action 491). Dataset 132 may include multiple instances of compilation authoring data 128 utilized by human editor 126 to generate content compilation(s) 144. Dataset 132 may be aggregated over time, may be updated as human editor 126 submits additional compilation authoring data 128 to system 100, and may be stored in compilation authoring database 130.

Dataset 132 may be obtained from compilation authoring database 130 by software code 110, executed by hardware processor 104 of computing platform 102. In implementations in which compilation authoring database 130 and software code 110 are co-located in system memory 106, hardware processor 104 may execute software code 110 to access dataset 132 directly. However, in implementations in which compilation authoring database 130 is stored remotely from software code 110, hardware processor 104 may execute software code 110 to obtain dataset 132 via communication network 108 and network communication links 118.

Flowchart 490 continues with generating, using trained machine learning model 112 and dataset 132, a compilation authoring template in an automated process (action 492). It is noted that as defined in the present application, the feature "trained machine learning model 112" refers to a mathematical model for making future predictions based on patterns learned from samples of data obtained from a set of trusted known matches and known mismatches, known as "training data." Various learning algorithms can be used to map correlations between input data and output data. These correlations form the mathematical model that can be used to make future predictions on new input data. Such a predictive model may include one or more logistic regression models, Bayesian models, or neural networks (NNs), for example.

According to various implementations of the present concepts, hardware processor 104 of computing platform 102 executes software code 110 to provide dataset 132 as input data to trained machine learning model 112, which in turn is configured to generate a compilation authoring template implementing an editorial style of human editor 126 learned from dataset 132 in an automated process. Thus, based on the work of human editors, content compilation system 100 can advantageously generate content compilation templates that are pre-populated with weighting factors and other authoring parameters characteristic of each human editor's editorial style. Those content compilation templates may then be utilized by software code 110 in an automated process for producing additional content compilation(s) 144 for end-users 124 without requiring further involvement in the authoring process by the human editors.

Accordingly, flowchart 490 can continue with producing, using end-user consumption profile 122a of end-user 124a and the compilation authoring template generated in action 492, another content compilation for end-user 124a (action 493). Action 493 may be performed by software code 110, executed by hardware processor 104 of computing platform 102, in a manner analogous to that described above by reference to actions 384, 385, and 386 of flowchart 380.

Flowchart 490 continues with computing another desirability score predicting the desirability of the content compilation produced in action 493 to end-user 124a (action 494). The desirability score computation in action 494 may be performed by software code 110, executed by hardware processor 104 of computing platform 102, in a manner analogous to that described above by reference to action 387 of flowchart 380.

In some implementations, flowchart 490 may continue and conclude with providing, when the desirability score computed in action 494 satisfies a predetermined threshold, the content compilation produced in action 493 to end-user 124*a* (action 495). Action 495 may be performed by software code 110, executed by hardware processor 104 of computing platform 102, in a manner analogous to that described above by reference to action 388 of flowchart 380. That is to say, action 495 may include pushing the content compilation produced in action 493 to end-user 124*a* when the desirability score computed in action 494 satisfies the predetermined threshold.

In some implementations, hardware processor 104 may further execute software code 110 to improve the performance of content compilation system 100 through additional machine learning by trained machine learning model 112 based on learned end-user tendencies. In those implementations, flowchart 490 may continue with optionally receiving feedback data 146 rating the actual desirability of the content compilation produced in action 493 to end-user 124*a* (action 496). As shown in FIG. 1, feedback data 146 may be received by software code 110 of content compilation system 100, executed by hardware processor 104, and via communication network 108 and network communication links 118.

In implementations in which flowchart 490 includes optional action 496, flowchart 490 can continue and conclude with optionally modifying, using trained machine learning model 112 and feedback data 146, the compilation authoring template generated in action 492 to improve the automated performance of content compilation system 100 (action 497). For example, software code 110, executed by hardware processor 104 of computing platform 102, may utilize trained machine learning model 112 to modify the compilation authoring template generated in action 492 by changing one or more weighting factors or other authoring parameters so as to increase the user desirability score computed for content compilations produced using the modified compilation authoring template.

Referring to FIGS. 3 and 4, it is emphasized that, in various implementations, actions 382-388, or actions 382-388 and 491-495, or actions 491-495, or actions 491-497, or 382-388 and actions 491-497 may be performed in an automated process from which human involvement may be omitted.

Thus, the present application discloses systems and methods for curating narrative experiences through automated content compilation that address and overcome the deficiencies in the conventional art. As disclosed above, an automated content compilation system according to the present novel and inventive concepts produces a content compilation for end-user(s), and computes a desirability score predicting the desirability of the content compilation to the end-user(s). The automated content compilation is performed by the system based on a consumption profile of the end-user(s) and either content authoring data received through an editorial interface from a human editor other than the end-user(s), or based on a compilation authoring template generated by a trained machine learning model of the system. When the desirability score for the content compilation produced by the present system satisfies a predetermined threshold, the content compilation may be pushed or otherwise provided to the end-user(s) sua sponte, i.e., proactively by the system, rather than in response to a request for the content compilation from the end user(s). Moreover, the disclosed system can further receive feedback data rating an actual desirability of the content compilation to the end-user(s), and modify, using the trained machine learning model and the feedback data, a compilation authoring template used by the system to advantageously improve the automated performance by the content compilation system in the future.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content compilation system comprising:
a computing platform having a hardware processor and a system memory;
a compilation authoring template generated using a trained-machine learning model and stored in the system memory, wherein the trained machine learning model is configured to generate the compilation authoring template implementing an editorial style of a human editor; and
a software code stored in the system memory;
the hardware processor configured to execute the software code to:
obtain a plurality of content items from at least one content source;
aggregate the plurality of content items, based on relevance to one another, into a plurality of content subsets, according to a respective one of a plurality of narrative stories of each of the plurality of content subsets;
produce a content compilation, using the compilation authoring template and by concatenating the plurality of content subsets, to create a narrative experience having a narrative arc determined by a sequence in which the plurality of content subsets are combined to produce the content compilation; and
provide the content compilation to one or more end-users.

2. The content compilation system of claim 1, wherein the content compilation is individualized for the one or more end-users based on a profile of the one or more end-users.

3. The content compilation system of claim 1, wherein the content compilation is unique to each of the one or more end-users.

4. The content compilation system of claim 1, wherein the hardware processor is further configured to execute the software code to:
determine a first desirability score predicting a first desirability of the content compilation to the one or more end-users.

5. The content compilation system of claim 4, wherein the first desirability score comprises an end-user relevance score.

6. The content compilation system of claim 4, wherein the hardware processor is further configured to execute the software code to:
  determine a second desirability score predicting a second desirability of a second content compilation to the one or more end-users; and
  provide the second content compilation to the one or more end-users, when the second desirability score satisfies a predetermined threshold.

7. The content compilation system of claim 1, wherein the hardware processor is further configured to execute the software code to:
  receive feedback data, wherein the feedback data rates an actual desirability of the content compilation to the one or more end-users; and
  modify, using the trained machine learning model and the feedback data, the compilation authoring template to improve a performance by the content compilation system.

8. A method for use by a content compilation system including a computing platform having a hardware processor and a system memory storing a software code and a compilation authoring template generated using a trained machine learning model, wherein the trained machine learning model is configured to generate the compilation authoring template implementing an editorial style of a human editor, the method comprising:
  obtaining, by the software code executed by the hardware processor, a plurality of content items from at least one content source;
  aggregating, by the software code executed by the hardware processor, the plurality of content items, based on relevance to one another, into a plurality of content subsets, according to a respective one of a plurality of narrative stories of each of the plurality of content subsets;
  producing a content compilation, by the software code executed by the hardware processor, using the compilation authoring template and by concatenating the plurality of content subsets, to create a narrative experience having a narrative arc determined by a sequence in which the plurality of content subsets are combined to produce the content compilation; and
  providing, by the software code executed by the hardware processor, the content compilation to one or more end-users.

9. The method of claim 8, wherein the content compilation is individualized for the one or more end-users based on a profile of the one or more end-users.

10. The method of claim 8, wherein the content compilation is unique to each of the one or more end-users.

11. The method of claim 8, further comprising:
  determining, by the software code executed by the hardware processor, a first desirability score predicting a first desirability of the content compilation to the one or more end-users.

12. The method of claim 11, wherein the first desirability score comprises an end-user relevance score.

13. The method of claim 11, further comprising:
  determining, by the software code executed by the hardware processor, a second desirability score predicting a second desirability of a second content compilation to the one or more end-users; and
  providing the second content compilation to the one or more end-users, by the software code executed by the hardware processor, when the second desirability score satisfies a predetermined threshold.

14. The method of claim 8, further comprising:
  receiving, by the software code executed by the hardware processor, feedback data, wherein the feedback data rates an actual desirability of the content compilation to the one or more end-users; and
  modifying, by the software code executed by the hardware processor, using the trained machine learning model and the feedback data, the compilation authoring template to improve a performance by the content compilation system.

\* \* \* \* \*